United States Patent
Brubaker

(10) Patent No.: US 10,001,225 B2
(45) Date of Patent: Jun. 19, 2018

(54) GEARED INTERFACE HAVING NON-LINEAR FEEDBACK

(71) Applicant: Bendix Commercial Vehicle Systems LLC, Elyria, OH (US)

(72) Inventor: Christopher L. Brubaker, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days. days.

(21) Appl. No.: 15/263,433

(22) Filed: Sep. 13, 2016

(65) Prior Publication Data
US 2018/0073661 A1    Mar. 15, 2018

(51) Int. Cl.
| | |
|---|---|
| *F16H 53/00* | (2006.01) |
| *F16K 31/53* | (2006.01) |
| *F16H 55/08* | (2006.01) |
| *F16H 19/08* | (2006.01) |
| *F16H 35/00* | (2006.01) |
| *F16H 19/00* | (2006.01) |
| *G05G 1/08* | (2006.01) |
| *G05G 5/03* | (2008.04) |

(52) U.S. Cl.
CPC ............ *F16K 31/53* (2013.01); *F16H 19/001* (2013.01); *F16H 19/08* (2013.01); *F16H 35/00* (2013.01); *F16H 55/084* (2013.01); *G05G 1/08* (2013.01); *G05G 5/03* (2013.01); *F16H 2035/003* (2013.01)

(58) Field of Classification Search
CPC .. F16H 19/08; F16H 2035/003; F16H 19/001; F16H 55/084; F16H 35/00; F16K 31/53; G05G 5/03; G05G 1/08
See application file for complete search history.

(56) References Cited

U.S. PATENT DOCUMENTS

| | | |
|---|---|---|
| 4,028,019 A | 6/1977 | Wildhaber |
| 4,031,345 A | 6/1977 | Garcia |

(Continued)

FOREIGN PATENT DOCUMENTS

| | | |
|---|---|---|
| EP | 1050643 A1 | 11/2000 |
| EP | 2090483 A1 | 8/2009 |
| JP | 07277173 A | 10/1995 |

OTHER PUBLICATIONS

Bendix Commercial Vehicle Systems LLC, "Bendix TCS-9000 Control Brake Valve," Service Data Sheet, Jun. 2005, 4 pages, Bendix Commercial Vehicle Systems LLC, Elyria OH USA.

(Continued)

*Primary Examiner* — Vicky A Johnson
(74) *Attorney, Agent, or Firm* — Cheryl L. Greenly; Brian E. Kondas; Eugene E. Clair

(57) ABSTRACT

An apparatus for an actuating mechanism comprises a first member having a first axis; the first member has a generally spherical surface on a first half of the first axis and a generally ellipsoidal surface on a second half of the first axis. The first member is rotatable around a centerpoint of the first axis. A second member has a second axis and a generally ellipsoidal surface. The second member matingly engages the first member at the first member ellipsoidal surface and has a torsion spring coupled to the second member. The first member is actuated manually to move the second member. The torsion spring torque increases as the first member is rotated.

8 Claims, 1 Drawing Sheet

(56) References Cited

U.S. PATENT DOCUMENTS

| | | | |
|---|---|---|---|
| 4,545,402 A | 10/1985 | Lyons | |
| 4,606,369 A | 8/1986 | McKay | |
| 4,838,226 A * | 6/1989 | Matsuzawa | F02D 11/04 |
| | | | 123/361 |
| 4,844,708 A | 7/1989 | Lopez | |
| 4,867,002 A | 9/1989 | Bouchet | |
| 5,758,684 A | 6/1998 | Hudson | |
| 5,809,780 A * | 9/1998 | de Jong | F16K 31/53 |
| | | | 137/625.21 |
| 5,950,765 A | 9/1999 | Person | |
| 6,048,186 A | 4/2000 | Kitano | |
| 6,095,488 A * | 8/2000 | Semeyn, Jr. | F02D 11/10 |
| | | | 185/40 R |
| 6,974,119 B2 * | 12/2005 | Brendle | F02D 11/10 |
| | | | 123/399 |
| 7,038,846 B2 | 5/2006 | Mandella | |
| 7,066,301 B2 | 6/2006 | Oh | |
| 7,575,285 B2 | 8/2009 | Bobby | |
| 8,312,785 B2 | 11/2012 | Breeser | |
| 8,840,197 B2 | 9/2014 | Eberling | |
| 9,227,312 B2 | 1/2016 | Wang | |
| 2006/0058105 A1 * | 3/2006 | Evans | B29C 45/14311 |
| | | | 464/181 |
| 2007/0056558 A1 | 3/2007 | Kondo | |
| 2007/0279401 A1 | 12/2007 | Ramstein | |
| 2008/0245174 A1 | 10/2008 | Fischer | |
| 2012/0137996 A1 | 6/2012 | Yang | |
| 2013/0133763 A1 | 5/2013 | Sulmone | |
| 2014/0290974 A1 | 10/2014 | Eriksson | |
| 2016/0159334 A1 | 6/2016 | Lichtenburg | |

OTHER PUBLICATIONS

International Searching Authority, "Notification of Transmittal of the International Search Report and the WRitten Opinion of the International Searching Authority," Search Report, dated Dec. 15, 2017, 12 pages, European Patent Office, Rijswijk Netherlands.

* cited by examiner

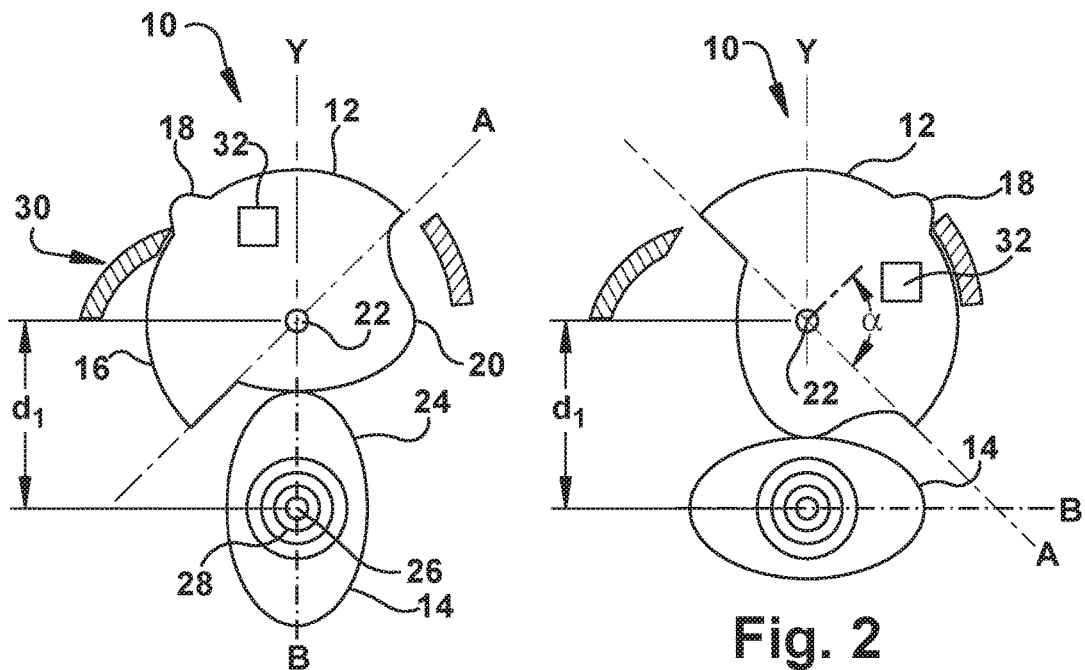
Fig. 1
Fig. 2
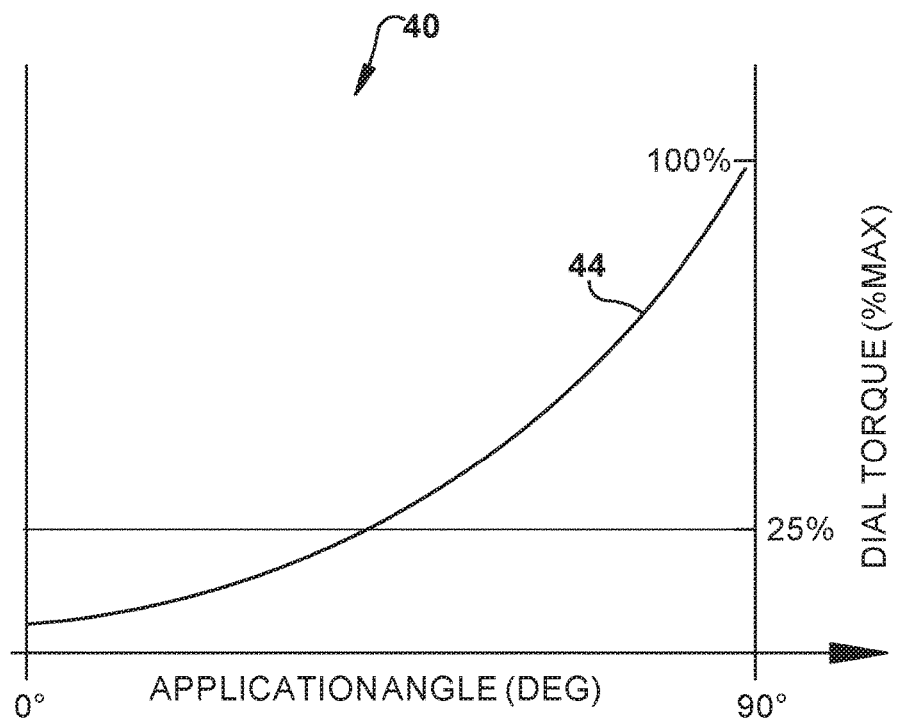
Fig. 3

GEARED INTERFACE HAVING NON-LINEAR FEEDBACK

BACKGROUND

The present invention relates to embodiments of a geared interface having non-linear feedback. Some pneumatic control valves do not have linear feedback when a cam/cam follower structure is part of the valve. As an operator moves the handle of this type of pneumatic control valve, the torque required to move the handle increases non-linearly as more air is delivered to the system through the valve. As valves move from pneumatic control devices to electronic control devices, there is a desire to maintain the non-linear feedback felt by the driver as he actuates the electronic valve so that the torque similarly increases as an electronic valve is moved between a first position and a second position.

SUMMARY

Various embodiments of an apparatus for an actuating mechanism comprise a first member having a first axis, the first member having a generally spherical surface on a first half of the first axis and a generally ellipsoidal surface on a second half of the first axis, the first member rotatable around a centerpoint of the first axis; a second member having a second axis and a generally ellipsoidal surface, the second member matingly engaging the first member at the first member ellipsoidal surface; and a torsion spring coupled to the second member; wherein the first member is actuated manually to move the second member and the torsion spring torque increases as the first member is rotated.

In accordance with another aspect, various embodiments of a method of providing nonlinear feedback to an operator comprise rotating a first member having an elliptical surface; matingly engaging a second member at an elliptical portion to rotate the second member around its centerpoint; restricting the rotation of the second member via a biasing member; and increasing the torque provided at the first member in a nonlinear manner as the first member is rotated from a first position to a second position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 1 illustrates a gear apparatus in a released position according to one example of the present invention.

FIG. 2 illustrates the gear apparatus of FIG. 1 in an applied position.

FIG. 3 illustrates a graphical representation of the torque feedback versus the angle of rotation of the gear apparatus.

DETAILED DESCRIPTION

FIG. 1 illustrates a actuating mechanism 10 having gears in a first, or released, position according to one example of the present invention. The actuating mechanism 10 comprises a first member 12 and a second member 14 that are matingly engaged. First member 12 and second member 14 may be meshed together using gear teeth (not shown) on each member or by other means.

The first member 12 has an axis A with a centerpoint for rotation. The first member 12 has an aperture 22 at the centerpoint of rotation on axis A. A pin (not shown) may be inserted into the aperture 22 when the gear apparatus is installed in a housing 30. The first member 12 is not shaped symmetrically around axis A. The first member 12 has a generally ellipsoidal surface 20 on one side of axis A and a generally spherical surface 16 on the opposite side of axis A from the generally ellipsoidal surface 20. The generally spherical surface 16 presents a uniform surface to the operator of the actuation mechanism 10 through the housing 30. The generally spherical surface 16 includes a nodule 18 that extends past the housing 30. The housing 30 also serves as a stop for the rotational motion of the first member 12.

In one example, a magnet 32 is placed on the first member 12 and rotates with the first member 12. The magnet 32 interfaces with a sensing device such as a Hall Effect sensor, optical sensor or other sensor type that can measure the angle of rotation of the first member 12. The sensor is stationary with respect to the first member 12 and may be installed in the housing 30. The sensor detects the position of the magnet 32 and transmits a signal to a controller (not shown) that is indicative of the rotation of the first member 12. The rotation relates to the amount of air the operator desires to transmit to the system via control of the actuation mechanism 10. The magnet 32 may be installed in the housing 30 or another stationary location with respect to the first member 12.

The second member 14 has an axis B and is generally symmetrical around axis B. An aperture 26 is located at the center point of rotation of the second member 14. A distance d1 exists between the aperture 22 of the first member 12 and the aperture 26 of the second member 14. A pin (not shown) may be inserted in the aperture 26. The second member may be coupled to the housing 30. The second member 14 has a generally ellipsoidal surface 24.

A biasing member 28 is attached to the second member 14 about the aperture 26. The biasing member 28 may be a torsion spring. The biasing member 28 increases the torque in a non-linear manner as the second member 14 is rotated. The biasing member 28 allows for higher precision in the first stages of motion of the first member 12 and slows the application rate of the actuation mechanism 10 to mimic a pneumatic valve. As the first member 12 reaches the end of its range of motion, the torque required to move the first member 12 increases greatly.

The first member 12 and the second member 14 may preferably be made from the same material. In one example, the material is a plastic material, such as glass filled nylon, to ensure stability. The first member 12 and the second member 14 may be molded from a plastic material.

In FIG. 2, the first member 12 and second member 14 are shown in a second, or actuated, position. The first member 12 is capable of being rotated an angle alpha (α) around the centerpoint of axis A. In one example, the angle alpha is about ninety (90) degrees.

The nodule 18 is used as a manual means to rotate the first member 12. The nodule may be sized to fit a thumb or may be connected to another manual means of rotating the first member 12, such as a lever. A gap in the housing 30 is sized to accommodate the rotation of the first member 12.

The second member 14 rotates in response to the rotation of the first member 12. The movement of second member 14 from the released position in FIG. 1 to the actuated position of FIG. 2 is relatively smooth as the ellipsoidal surface of the first member 12 rotates against the ellipsoidal surface of the second member 14. Second member 14 does not move linearly in response to the rotation of the first member 12 due to the elliptical shape of the first member 12 and second member 14. The distance d1 from the centerpoint of the first member 12 and the second member 14 does not change.

The biasing member 28 acts against the rotation of the first member 12 to increase the torque required to rotate the first member 12. However, the elliptical interface between the first member and the second member interact to increase the torque required in a non-linear manner. The torque required to move the first member 12 from the first position to the second position is between about five (5) inches pounds and about ten (10) inch pounds. The purpose is to provide a slower apply feel and more precision at the initial rotation.

FIG. 3 illustrates a graph 40 showing the torque with respect to the application angle alpha on the x axis. While the first member 12 is rotated from the first position to the second position, the torque required to continue rotating the first member 12 for the full ninety degrees changes in an exponential fashion as the angle increases as shown with line 44. Therefore the operator will require more torque to move the actuation mechanism 10 into the second position as the angle increases. The feel of the actuation mechanism 10 will then more closely mimic the pneumatic only control valves.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An actuating mechanism comprising:
   a first member having a first axis, the first member having a generally spherical surface on a first half of the first axis and a nodule on the spherical surface for facilitating rotation of the first member and a generally ellipsoidal surface on a second half of the first axis, the first member rotatable around a centerpoint of the first axis;
   a second member having a second axis and a generally ellipsoidal shape, the second member matingly engaging the first member at the first member ellipsoidal surface; and
   a biasing member coupled to the second member; wherein the torque required to move the first member from a first position to a second position increases non-linearly until the rotational motion of the first member is stopped by the nodule contacting a housing of the actuating member.

2. The actuating mechanism as in claim 1, further comprising a sensing device for providing a signal proportional to the angular position of the first member.

3. The actuating mechanism as in claim 1, wherein the first member rotates about ninety degrees from the first position to the second position.

4. The actuating mechanism as in claim 1, wherein the first member and the second member are formed of a nylon material.

5. An apparatus for providing non-linear feedback upon manual operation comprising:
   a first member having a first axis, the first member having a generally spherical surface on a first half of the first axis and a nodule on the spherical surface for facilitating rotation of the first member and a generally ellipsoidal surface on a second half of the first axis, the first member rotatable around a centerpoint of the first axis;
   a second member having a second axis and a generally ellipsoidal surface, the second member matingly engaging the first member at the first member ellipsoidal surface; and
   means for increasing the torque non-linearly during the rotation as the first member is rotated manually at the nodule.

6. A method of providing nonlinear feedback to an operator comprising:
   manually rotating a first member having an elliptical surface and a spherical surface, wherein manual rotation is facilitated by a nodule on the spherical surface;
   matingly engaging a second member at an elliptical surface of the second member to rotate the second member;
   restricting the rotation of the second member via a biasing member; and
   increasing the torque required to move the first member in a nonlinear manner as the first member is rotated manually from a first position to a second position wherein the rotational motion of the first member is stopped by the nodule contacting a housing.

7. The method as in claim 6, wherein the torque is reduced as the first member is released.

8. The method as in claim 6, wherein the torque required to move the first member and second member from the first position to the second position is between about 5 inch pounds and about 10 inch pounds.

* * * * *